United States Patent
Jung et al.

(10) Patent No.: US 8,432,831 B2
(45) Date of Patent: Apr. 30, 2013

(54) METHOD OF ROUTING PATH IN WIRELESS SENSOR NETWORKS BASED ON CLUSTERS

(75) Inventors: Sung Young Jung, Gyeongsangnam-do (KR); Jain Hoon Kim, Gyeonggi-do (KR); Dong Wook Lee, Gyeonggi-do (KR); We Duck Cho, Gyeonggi-do (KR)

(73) Assignee: Ajou University Industry Cooperation Foundation, Gyeonggi-do (KR)

( * ) Notice: Subject to any disclaimer, the term of this patent is extended or adjusted under 35 U.S.C. 154(b) by 540 days.

(21) Appl. No.: 12/739,793

(22) PCT Filed: Oct. 30, 2007

(86) PCT No.: PCT/KR2007/005401
§ 371 (c)(1),
(2), (4) Date: Apr. 26, 2010

(87) PCT Pub. No.: WO2009/057833
PCT Pub. Date: May 7, 2009

(65) Prior Publication Data
US 2010/0254302 A1     Oct. 7, 2010

(30) Foreign Application Priority Data
Oct. 30, 2007  (KR) .................. 10-2007-0109501

(51) Int. Cl.
*H04L 12/28*          (2006.01)

(52) U.S. Cl.
USPC .......................................... 370/254; 709/242

(58) Field of Classification Search .......... 370/254–258, 370/315–327; 709/238–244
See application file for complete search history.

(56) References Cited

U.S. PATENT DOCUMENTS 6,208,247 B1     3/2001     Agre et al. ............ 340/539
6,304,556 B1 *   10/2001    Haas ..................... 370/254
(Continued)

FOREIGN PATENT DOCUMENTS

KR     10-2006-0111227     10/2006

OTHER PUBLICATIONS

Cho, et al., "A Solution for Void Grid in Routing Protocol Supporting Mobile Sink on Sensor Network." *Korea Computer Congress* 2007, vol. 34, No. 1(D), pp. 306-309.

(Continued)

*Primary Examiner* — Jeffrey M Rutkowski
(74) *Attorney, Agent, or Firm* — Harness, Dickey & Pierce, P.L.C.; Anthony G. Fussner; Kisuk Lee

(57) ABSTRACT

A routing method for a cluster-based wireless sensor network is provided for improving lifespan of the network and reducing network traffic. A routing method is proposed for a wireless sensor network having a sensor field defined by a plurality of clusters each including a plurality of sensor nodes and a header node, one of the cluster is a head cluster including a sink node. The routing method includes announcing, at least one sensor node which is the sensor node detected an event, the event; requesting, at the sink node, the source node to transmit data required for ubiquitous services; and transmitting, at the at least one source node, data to the sink node. Announcing the event includes relaying, at the at least one source node, a data announcement packet from a source cluster to which the source node belongs to a destination cluster which is arranged along an ith second direction axis through the header nodes of the clusters arranged along a first direction axis of the source cluster. The routing method of the present invention reduces the transmission amounts of data request and data packets, thereby conserving the energy and bandwidth, resulting in improvement of network life time.

18 Claims, 8 Drawing Sheets

U.S. PATENT DOCUMENTS

| | | | |
|---|---|---|---|
| 6,718,394 B2 * | 4/2004 | Cain | 709/242 |
| 6,788,650 B2 * | 9/2004 | Chen et al. | 370/254 |
| 6,990,080 B2 | 1/2006 | Bahl et al. | 370/254 |
| 2003/0151513 A1 * | 8/2003 | Herrmann et al. | 370/254 |
| 2007/0019569 A1 * | 1/2007 | Park et al. | 370/254 |
| 2010/0110930 A1 * | 5/2010 | Kohvakka et al. | 370/254 |

OTHER PUBLICATIONS

Jung, et al., "Grid-based Energy Efficient Routing Protocol for Sensor Networks" *Korea Computer Congress* 2007, vol. 34, No. 1(A), pp. 133-134 (Cited in WO 2009/057833 A1 as non-prejudicial disclosure or exceptions to lack of novelty under Rules 4.17(v) and 51 *bis*.1(a)(v)).

\* cited by examiner

METHOD OF ROUTING PATH IN WIRELESS SENSOR NETWORKS BASED ON CLUSTERS

CROSS REFERENCE TO RELATED APPLICATION

This application is a 371 of PCT International Application No. PCT/KR2007/005401 filed Oct. 30, 2007 (Publication No. WO 2009/057833), which claims priority to Korean Patent Application No. 10-2007-0109501, filed Oct. 30, 2007. The disclosures of the above applications are incorporated herein by reference in their entirety.

TECHNICAL FIELD

The present invention relates to a ubiquitous computing and, in particular, to a routing method for a cluster-based wireless sensor network that is capable of improving lifespan of the network and reducing network traffic by efficiently transmitting advertisement packets and data request packets.

BACKGROUND ART

Ubiquitous computing refers to building a global computing environment where seamless and invisible access to computing resources is provided to user anytime anywhere. A ubiquitous computing environment can be implemented on the basis of well-internetworked computing devices for recognizing situations of everyday human life space.

In order to recognize the situations, the ubiquitous computing system collects data transmitted by sensors around target regions. Typically, cluster-based sensor network provides an efficient architecture for collecting the data detected by the sensors. The sensor network is composed of a large number of sensor nodes having capabilities to collect data in response to a request sent by a sink node and route collected data back to the sink node.

In the conventional cluster-based wireless sensor network, however, frequent data request by the sink node and data reporting by the sensor nodes increase traffic and processing loads of the sensor network, resulting in reduction of network life time.

DETAILED DESCRIPTION OF THE INVENTION

Technical Problem

The present invention has been made in an effort to solve the above problems, and it is an object of the present invention to provide a routing method for a cluster-based wireless sensor network that is capable of reducing traffic load and conserving battery power of sensor nodes by efficiently transmitting packets.

Technical Solution

In accordance with an aspect of the present invention, the above and other objects are accomplished by a routing method for a wireless sensor network having a sensor field defined by a plurality of clusters each including a plurality of sensor nodes and a header node, one of the cluster is a head cluster including a sink node. The routing method includes announcing, at at least one sensor node which is the sensor node detecting an event, the event; requesting, at the sink node, the source node to transmit data required for ubiquitous services; and transmitting, at the at least one source node, data to the sink node. Preferably, announcing the event includes relaying, at the at least one source node, a data announcement packet from a source cluster to which the source node belongs to a destination cluster which is arranged along an $i^{th}$ second direction axis through the header nodes of the clusters arranged along a first direction axis of the source cluster.

Preferably, the $i^{th}$ second direction axis is a center second direction axis in the sensor field, the sensor field comprising the clusters defined at cross sections of the a plurality of first and second direction axes.

Preferably, the first direction axis is a vertical direction axis in a sensor field, the sensor field comprising the clusters defined at cross sections of a plurality of first and second direction axes.

Preferably, a plurality of source nodes and source and destination clusters exist in the sensor field.

Preferably, announcing the event includes detecting the event; generating a data announcement packet as the source node; and forwarding the data announcement packet to a header node of the destination cluster via header nodes arranged along a routing path to the destination cluster.

Preferably, forwarding the data announcement packet includes transmitting the data announcement packet to a header node of the source cluster; caching, at the header node of the source cluster, the data announcement packet; determining, at the header node of the source cluster, whether to relaying the data announcement packet to the header node of the destination cluster via header nodes of the neighbor clusters arranged on the routing path; and relaying, if it is determined to forward the data announcement packet, the data announcement packet to the header node of the destination cluster.

Preferably, relaying the data announcement packet to the header node of the destination cluster includes determining, at the header node of each clusters arranged on the routing path to the destination cluster, whether to forward the data announcement packet to a predetermined cluster; and forwarding the data announcement packet to the predetermined cluster on the basis of the determination result.

Preferably, the predetermined cluster is a next hop cluster arranged on the routing path.

Preferably, requesting the source node to transmit data includes transmitting a first phase data request packet to header nodes of clusters arranged along the $i^{th}$ second direction axis; and transmitting, at the header nodes of the clusters arranged along the $i^{th}$ second direction axis, a second phase data request packet to the source node of the corresponding source cluster.

Preferably, transmitting a first phase data request packet includes forwarding the first phase data request packet to header nodes of clusters arranged along $j^{th}$ second direction axis together with the head cluster which includes at least one immediate agent node corresponding to the sink node, header nodes of the clusters arranged along $i^{th}$ second direction axis, and header nodes of the clusters arranged along an second direction axis on which the source cluster is positioned between the $j^{th}$ and $i^{th}$ horizontal axes.

Preferably, the immediate agent node is a sensor node located at a nearest position from the sink node.

Preferably, the first direction axis is a vertical axis and the second direction axis is a horizontal axis.

Preferably, transmitting a second phase data request packet includes determining, at the header node of each cluster arranged along the $i^{th}$ second direction axis, whether the cached data announcement packet is valid; determining, if the cached data announcement packet is valid, whether to forward the second phase data request packet to the source node;

and forwarding, if it is determined to forward the second phase data request packet, the second phase data request packet to the source node.

Preferably, determining whether the cached data announcement packet is valid is performed on the basis of a data generation time contained in the data announcement packet.

Preferably, determining whether to forward the second phase data request packet to the source node is performed on the basis of relative locations of the source node and sink node.

Preferably, determining whether to forward the second phase data request packet to the source node includes dividing the sensor field into a first and second half areas; and determining, if the source and sink nodes are located in the same half area, to forward second phase data request packet to the source node.

Preferably, the sensor field is divided into the first and second by a second direction axis.

Preferably, forwarding the second phase data request packet includes transmitting the second phase data request packet in an inverse direction of the routing path of the data announcement packet.

Preferably, transmitting a first phase data request packet includes detecting a movement of the sink node after transmitting the first phase data request packet; and forwarding, if a movement of the sink node is detected, the first phase data request packet from an old immediate agent node to a new immediate agent node.

Preferably, the routing method is characterized by use in community computing.

Advantageous Effects

The routing method for a cluster-base wireless sensor network according to the present invention reduces the number of data request and data packets transmission, thereby conserving the energy and bandwidth, resulting in improvement of network life time.

BEST MODE

Exemplary embodiments of the present invention are described with reference to the accompanying drawings in detail. The same reference numbers are used throughout the drawings to refer to the same or like parts. Detailed descriptions of well-known functions and structures incorporated herein may be omitted to avoid obscuring the subject matter of the present invention.

In the following, it is assumed that the wireless sensor network is constructed with a plurality of clusters, each comprising a large number of sensor nodes and a header node, and a head cluster which further includes a sink node.

Figure 1:
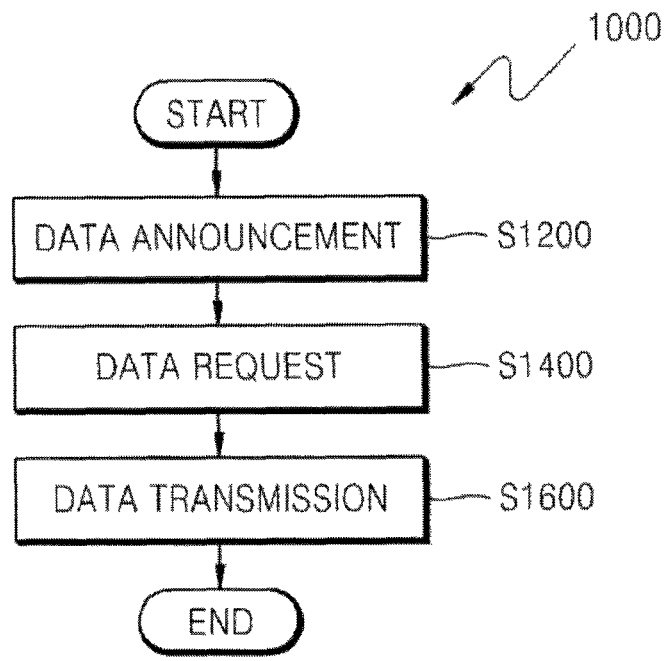
FIG. 1 is a flowchart illustrating a routing method for a wireless sensor network according to an exemplary embodiment of the present invention

FIG. 1 is a flowchart illustrating a routing method for a wireless sensor network according to an exemplary embodiment of the present invention.

Referring to FIG. 1, a routing method 1000 according to an embodiment of the present includes a data announcement process S1200 in which a sensor node senses an event and sends a data announcement packet as a source node, a data request process (S1400) in which a sink node sends a data request packet in response to the data announcement packet, and a data collection process (S1600) in which the source node sends data packet in response to the data request packet.

Figure 2:
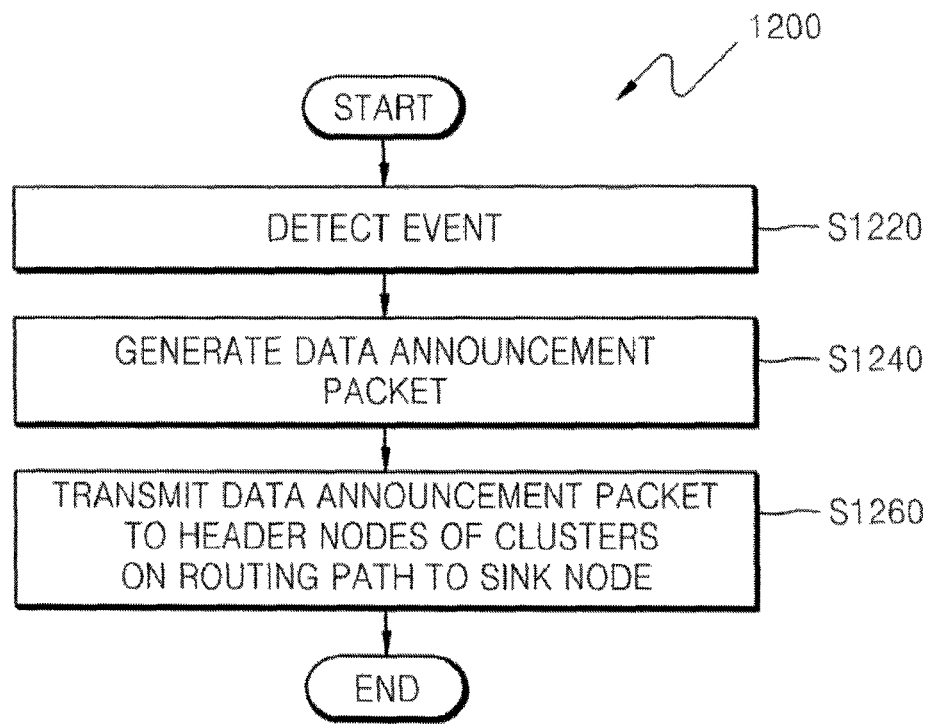
FIG. 2 is a flowchart illustrating a data announcement process of the routing method of FIG. 1.

FIG. 2 is a flowchart illustrating a data announcement process of the routing method of FIG. 1.

Referring to FIG. 2, the data announcement process includes a detection step S1220 in which the source node detecting the event, a data announcement packet generation step S1240 in which the source node generates the data announcement packet, and a transmission step S1260 in which the source node transmits the data announcement packet to header nodes of the clusters on the routing path to the sink node.

Figure 3:
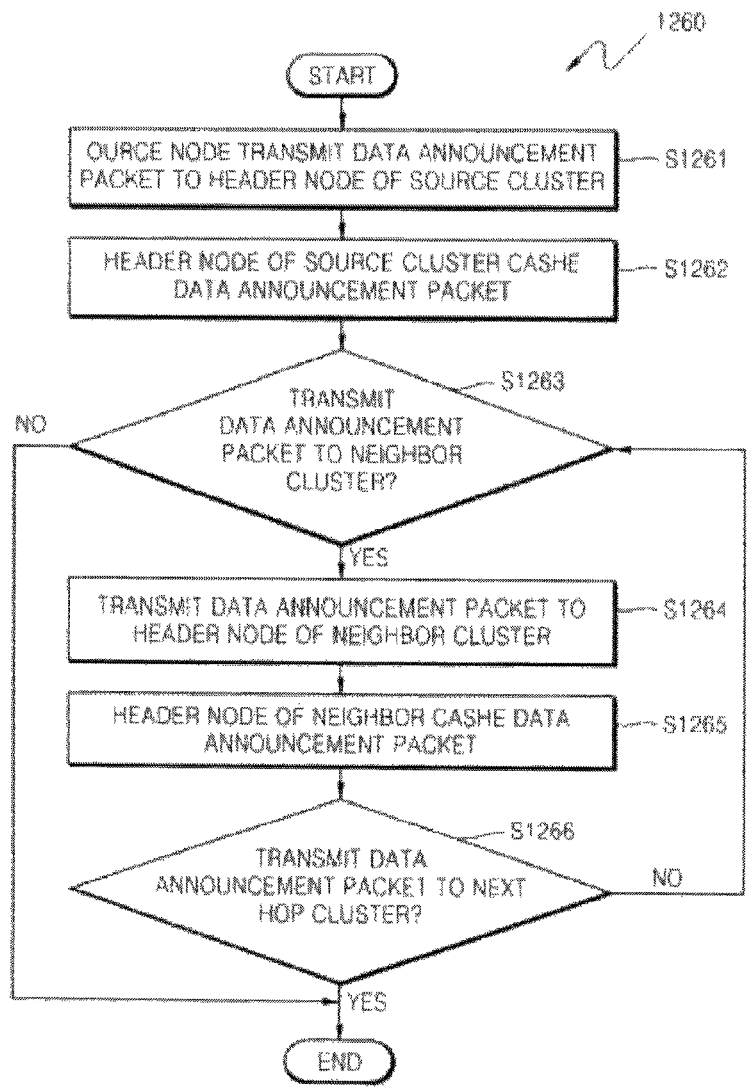
FIG. 3 is a flowchart illustrating the transmission step of the data announcement process of FIG. 2.

FIG. 3 is a flowchart illustrating the transmission step of the data announcement process of FIG. 2.

Referring to FIG. 3, the transmission step S1260 includes a first transmission step S1261 in which the source node transmits the data announcement packet to a header node of a first cluster, a first storage step S1262 in which the header node of the first cluster stores the data announcement packet received from the source node, a determination step S1263 in which the header node of the first cluster determines whether to transmit the data announcement packet to a neighbor cluster, and a forwarding step S1264 in which the header node of the first cluster transmits the data announcement packet to a header node of the neighbor cluster selected according to the determination result.

In the transmission step S1260, the data announcement packet is relayed by the header nodes of clusters on a data announcement packet routing path formed along a first axis between the first cluster and $i^{th}$ cluster. Preferably, the $i^{th}$ cluster is located at the center of the first axis in the sensor field. The first axis can be a second direction axis. Also, there can be multiple source nodes, first clusters and $i^{th}$ clusters in the sensor field.

The transmission step S1260 further includes a second storage step S1265 in which, if the data announcement packet is received, the head node of the neighbor cluster caches the data announcement packet.

Preferably, the transmission step S1260 further includes a determination step S1266 in which the header node of a cluster received the data announcement packet determines whether to transmit the data announcement packet to a header nod of next hop cluster, repeatedly. Another neighbor cluster can be one on the data announcement packet routing path.

Figure 4:
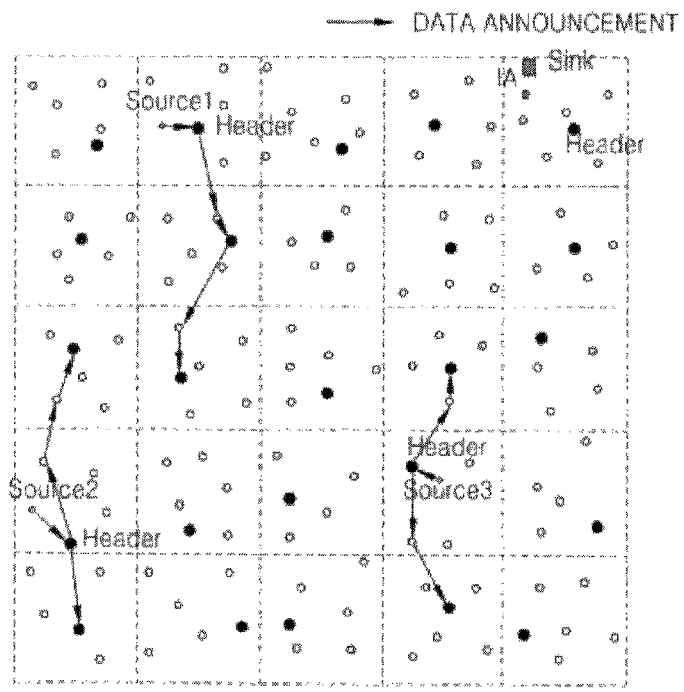
FIG. 4 is a diagram illustrating how to route a data announcement packet in a wireless sensor network according to an exemplary embodiment of the present invention.

FIG. 4 is a diagram illustrating how to route a data announcement packet in a wireless sensor network according to an exemplary embodiment of the present invention.

In FIG. 4, the dotted line defines a sensor field and clusters of the wireless sensor network. Each cluster includes a plurality of sensor nodes (white spots) and a header node (black spot). The top left cluster is a head cluster having a sink node. The sink node is responsible for controlling the sensor field of the wireless sensor network and collects data from the sensor nodes.

Referring to FIG. 4, three sensor nodes, i.e. the source nodes (source 1, source 2, and source 3), detect events so as to transmit announcement packets to their respective $i^{th}$ clusters. The $i^{th}$ clusters are clusters located in the middle of vertical axes.

The sensor nodes and sink node satisfy the following conditions:

(i) Each sensor node and sink node measure their location, respectively.

(ii) Each sensor node and sink node know the range of the sensor field.

(iii) Each sensor node may have no mobility.

(iv) Each sensor node can measure its battery residual capacity.

After the sensor nodes are deployed in the sensor field, each sensor node locates itself and determines a cluster identifier (ID) to which the sensor node belongs on the basis of self-location information. After a predetermined time, each sensor node performs flooding header announcement packets into the cluster. The header announcement packet includes a node location, cluster ID, header announcement packet generation time, and header maintenance time.

Each sensor node compares the cluster ID of a received header announcement packet and its cluster ID and discards, if the cluster IDs do not match each other, the header announcement packet. Accordingly, the header announcement packet flooding is restricted within the cluster. The sensor node discards the header announcement packet of which generation time is later than its. In this manner, only the header announcement packet having the most earl generation time is flooded within the cluster and the sensor node becomes the header node until the header maintenance time expires.

The header maintenance time is determined depending on the battery residual capacity of the sensor node. That is, the sensor node measures its battery residual capacity and sets the header maintenance time on the basis of the measured battery residual capacity. In order to select a next header node, the sensor nodes flood the header announcement packets before the header maintenance time of the current header node expires. This header node determination can be accomplished in identical with the initial header node determination.

Referring to FIGS. 1 to 4, if an event occurs in the above structured wireless sensor network, a sensor node sensed the event for the first time becomes the source node at step S1220. The source node generates a data announcement packet including information on its location, cluster ID, and collection time to a local header node of the cluster to which it belongs at step S1240.

If the data announcement packet is received, the local header node forwards the data announcement packet to the header nodes of neighbor clusters arranged in vertical direction at step S1260. In this manner the data announcement packet is delivered in vertical direction within the sensor field.

At this time, the data announcement packet is relayed to the header node of a vertically middle cluster ($i^{th}$ cluster in vertical direction).

As described above, the data announcement packets generated by the source nodes at their respective clusters are delivered to the header nodes of corresponding middle clusters arranged on their vertical axes. The header nodes received the data announcement packets store the data announcement packets within their cache (S1262).

Figure 5:
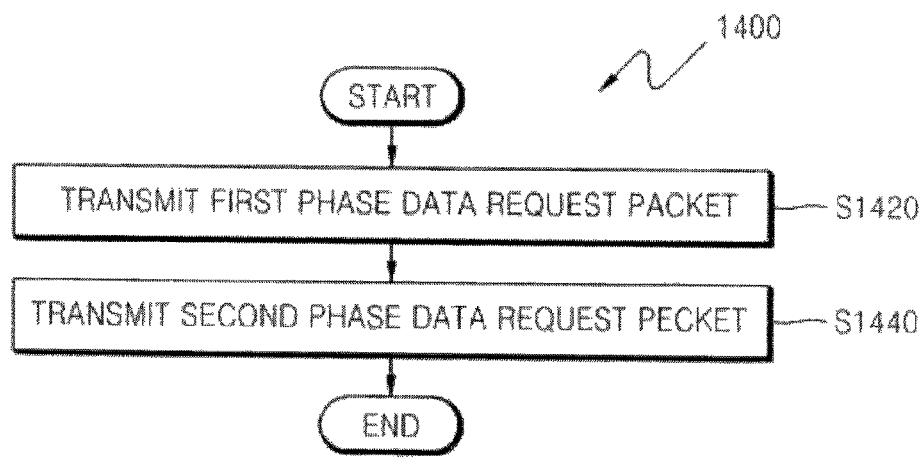
FIG. 5 is a flowchart illustrating a data request process of the routing method of FIG. 1.

FIG. 5 is a flowchart illustrating a data request process of the routing method of FIG. 1.

Referring to FIG. 5, the data request process S1400 includes a first data request step S1420 in which a sink node transmits a data request packet to the header nodes of the $i^{th}$ clusters and a second data request step S1440 in which the header nodes of the $i^{th}$ clusters relay the data request packet to the source nodes of the respective first clusters.

In the first data request step S1420, the data request packet can be relayed to the $i^{th}$ clusters through header nodes of the $j^{th}$ intermediate clusters arranged along their second axis, $i^{th}$ intermediate clusters arranged along their second axis, and the clusters arranged along the first axes perpendicular to the second axes crossing the $i^{th}$ and $j^{th}$ clusters. Here, the first axes are vertical axes and the second axes are horizontal axes crossing the vertical axes.

Figure 6:
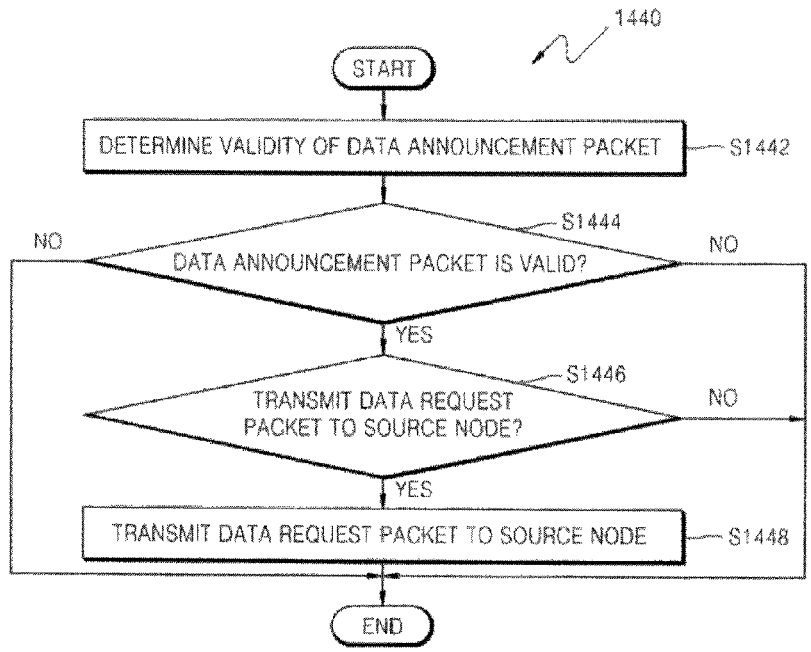
FIG. 6 is a flowchart illustrating a second data request step of the data request process of FIG. 5.

FIG. 6 is a flowchart illustrating a second data request step of the data request process of FIG. 5.

Referring to FIG. 6, the second data request step S1440 includes a valid check step S1442 in which the header node of the $i^{th}$ cluster checks validity of the cached data announcement packet, a validity determination step S1444 in which the header node of the $i^{th}$ cluster determines whether the data announcement packet is valid, a delivery determination step S1446 in which, if the data announcement packet is valid, the header node of the $i^{th}$ cluster determines whether to deliver the data request packet to the source node, and transmission step S2448 in which, if it is determined to deliver the data announcement packet, the header node of the $i^{th}$ cluster transmits the data request packet to the source node. The validity determination step S1444 and delivery determination steps S1446 are described with reference to FIG. 7 in more detail.

Figure 7:
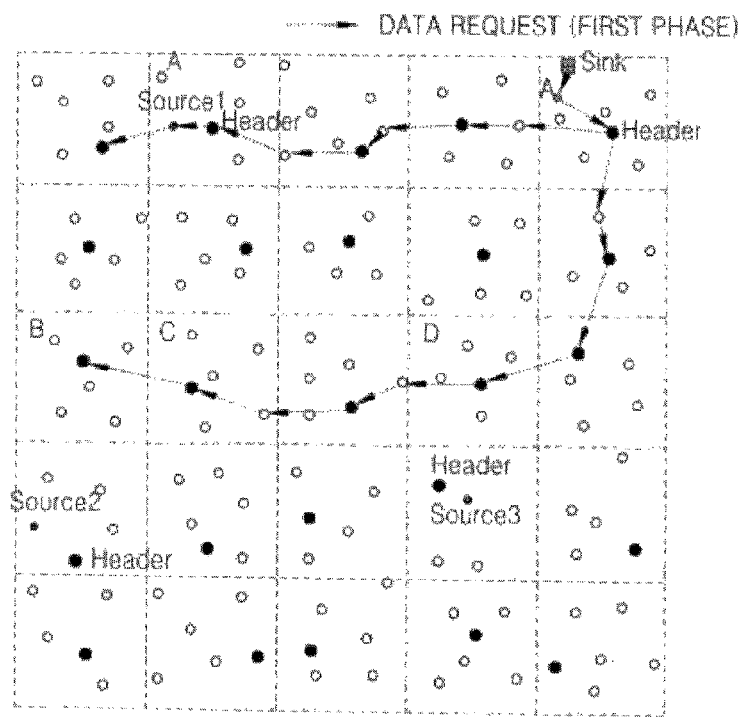
FIG. 7 is a diagram illustrating how to deliver a data request packet in the first data request step of FIG. 5.
Figure 8:
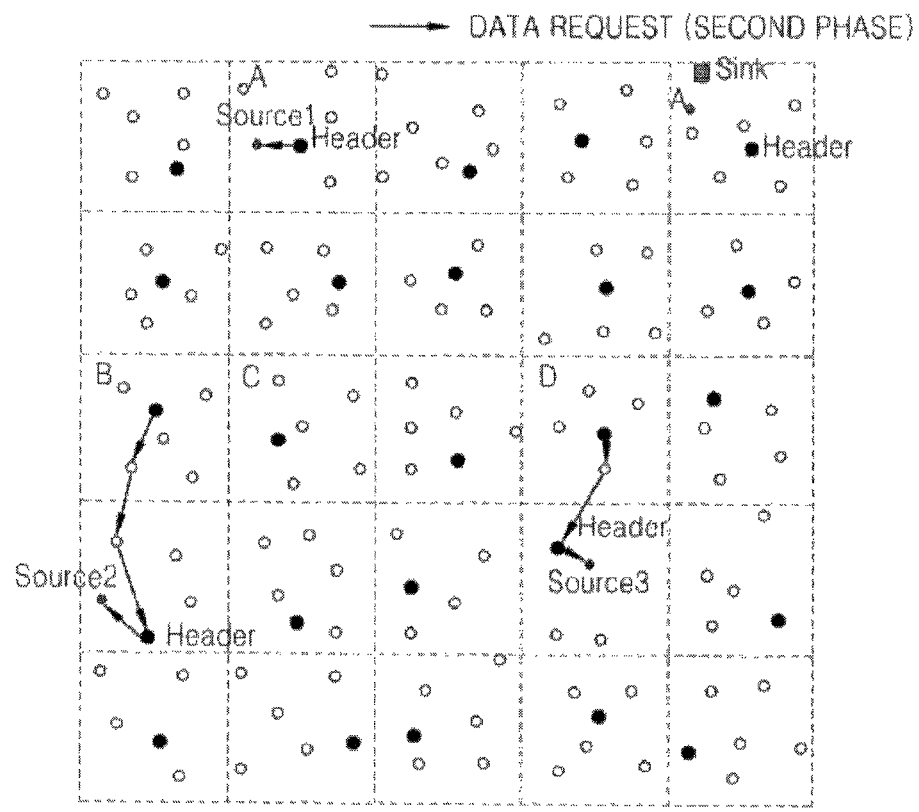
FIG. 8 is a diagram illustrating how to deliver a data request packet in a second data request step of FIG. 5.

FIG. 7 is a diagram illustrating how to deliver a data request packet in the first data request step of FIG. 5, and FIG. 8 is a diagram illustrating how to deliver a data request packet in a second data request step of FIG. 5.

Referring to FIGS. 1 and 5 to 8, the sink node selects one of the nearest sensor nodes as an immediate agent (IA) node. If a data collection is required, the sink node generates a data request packet including information on an IA location and cluster ID to the IA node such that the IA node delivers the data request packet to the local header nodes.

The IA node exists for securing routing stability with mobile sink node. If the sink node moves such that the IA node is unreachable, it selects a new IA node. The two IA nodes exchange information for maintaining a communication path. According, the sink node can maintain communication with one of the IA nodes on the move and can be located by the IA nodes.

The data request process S1400 is divided into two data request steps. In the first data request step S1420, the data request packet is delivered to the header nodes of predetermined clusters. In the second request step S1440, the data request packet is delivered to the source node that transmits the data announcement packet.

If a data collection is required, the sink node transmits a data request packet to the header node of the cluster, to which the sink node belongs, via the IA node. Upon receiving the data request packet, the local header node relays the data request packet to the local headers of the clusters arranged on the same second direction axis. Also, the data request packet is relayed to the header nodes of the clusters ($i^{th}$ clusters) arranged along a central second direction axis ($i^{th}$ second direction axis) (see FIG. 7). In this manner, the data request packet is delivered to the local header nodes of the clusters on the two horizontal axes: the first second direction axis and center second direction axis. These delivery paths are parts of the data request packet routing path.

The header node of each cluster arranged along the center second direction axis relays the data request packet to the header node of the neighbor cluster. All the header nodes received the data request packet store information on the data request packet.

In FIG. 8, it is assumed that the header nodes of clusters A, B, C, and D that are located on the first or center second direction axis storing respective data announcement packet transmitted by their corresponding source node. If the header nodes of the clusters A, B, C, and D receive the data request packet, each header node checks the validity of its data announcement packet (S1442).

The validity of the data announcement packet is checked on the basis of the data generation time contained in the data announcement packet. If it is determined that the data announcement packet is valid (S1444), the header node determines whether to transmit the data request packet to the source node (S1446).

Whether to transmit the data request packet to the source node is determined the locations of the source node and sink node. If the source node and sink node are located in different half areas divided by the center second direction axis, the header node transmits the data request packet to the source node directly. In FIG. 8, the header nodes of the clusters B and D are the case.

However, if the source node and sink node are located in the same half area, the header nodes of two clusters receive the data announcement packet and data request packet, respectively. Since transmitting the data request packet by the two clusters causes redundant traffic, one of the two clusters should not transmit the data request packet.

In this case, the header nodes of the two clusters checks a Y-coordinate of the cluster ID of the head cluster to which the sink node belongs and then only the header node of the cluster of which cluster ID has an Y-coordinate identical with that of the head cluster transmits the data request packet to the source node. For this reason, the head node of the cluster A, but not C, transmits the data request packet to the source node 1. Accordingly, the header nodes of the clusters A, B, and D transmit the data request packets to the header nodes of the clusters to which the source nodes belong through the inverse routes of the data announcement packets. In this manner, the data request packet is delivered to the source nodes (S1448).

Returning to FIG. 1, each source node received the data request packet transmits a data packet to the sink node in response to the data request packet at step S1600.

Figure 9:
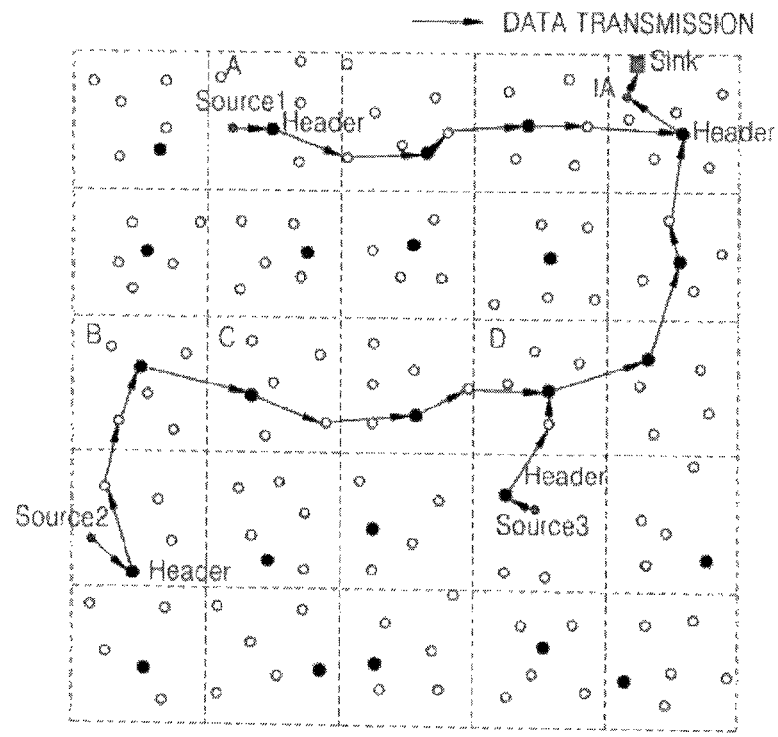
FIG. 9 is a diagram illustrating how to route data packet to a sink node in a wireless sensor network according to an exemplary embodiment of the present invention.

FIG. 9 is a diagram illustrating how to route data packet to a sink node in a wireless sensor network according to an exemplary embodiment of the present invention.

Referring to FIGS. 1 and 9, the source node received the data request packet transmits its data packet to the local header node and the local header node forwards the data packet to the header node of the head cluster to which the sink node belongs.

The header node of the head cluster transmits the data packet to the sink node via the IA node. At this time, if a new IA node is selected by the movement of the sink node, the data packet is forwarded to the new IA node by the old IA node, which knows the location of the new IA node. Accordingly, the sink node receives the data packet from the new IA node.

Figure 10:
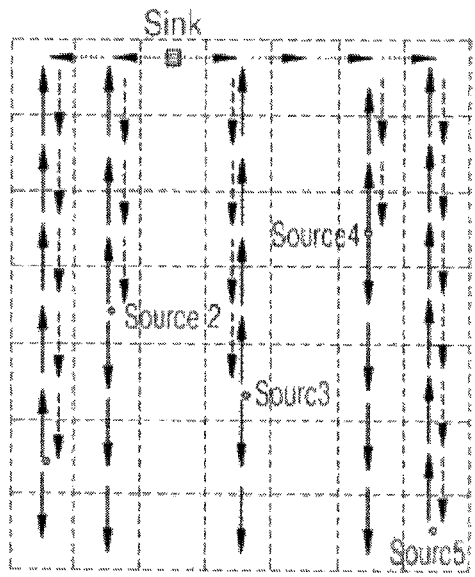
FIGS. 10 and 11 are diagrams illustrating a packet routing method of an embodiment of the present invention and a conventional Cluster-based Power Efficient Routing (CBPER) method.
Figure 11:
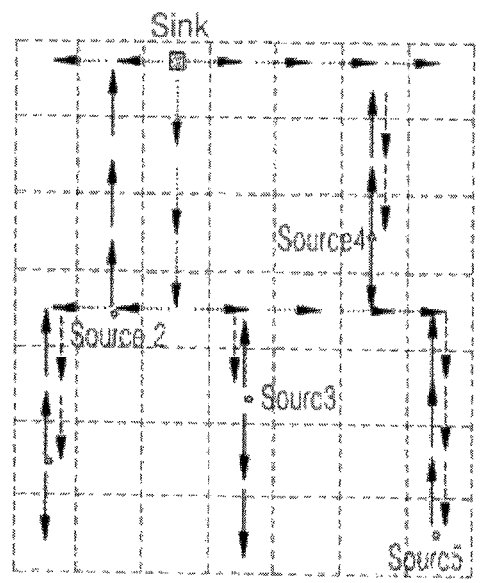

FIGS. 10 and 11 are diagrams illustrating a packet routing method of an embodiment of the present invention and a conventional Cluster-based Power Efficient Routing (CBPER) method.

In FIGS. 10 and 11, it is assumed that the wireless sensor network includes one sink node and 5 source nodes that exchange packets.

In the CBPER method of FIG. 10, a data announcement packet transmitted by each source node forwarded to the clusters arranged in vertical directions (solid arrows), a first phase data request packet is transmitted to the clusters in horizontal directions by the sink node (dotted arrows), and a second phase data request packet is transmitted from the cluster at which both the data announcement packet and the first phase data request packet are received to the source node (dashed arrows). In this case, 30 data announcement packets, 6 first phase data request packets, and 20 second phase data request packets are forwarded in the network.

As shown in FIG. 11, in the routing method according to an embodiment of the present invention, the data announcement packet is transmitted by each source node in vertical direction such that the data announcement packet reaches to a cluster arranged in the center second direction axis (solid arrows), a first phase data request packet is transmitted by the sink node such that the first phase request packet is received by the clusters arranged along the first horizontal line on which the head cluster locates and the center horizontal line (dotted arrows), and the second phase data request packet is transmitted from the cluster at which both the data announcement packet and the first phase data request packet are received to the source node (dashed arrows). In this case, 15 data announcement packets, 15 first phase data request packets, and 8 second phase data request packets are forwarded in the network.

That is, the total numbers of the packets required for collecting the data in the wireless sensor networks using the CBPER method and the routing method of the present invention are 56 and 38, respectively. From this comparison result, the routing method according to the present invention is superior to the conventional CBPER method in traffic load and, in turn, the energy efficiency.

FIGS. 12 to 17 are graphs illustrating performance comparison results between the conventional CBPER method and a routing method according to an exemplary embodiment.

Figure 12:
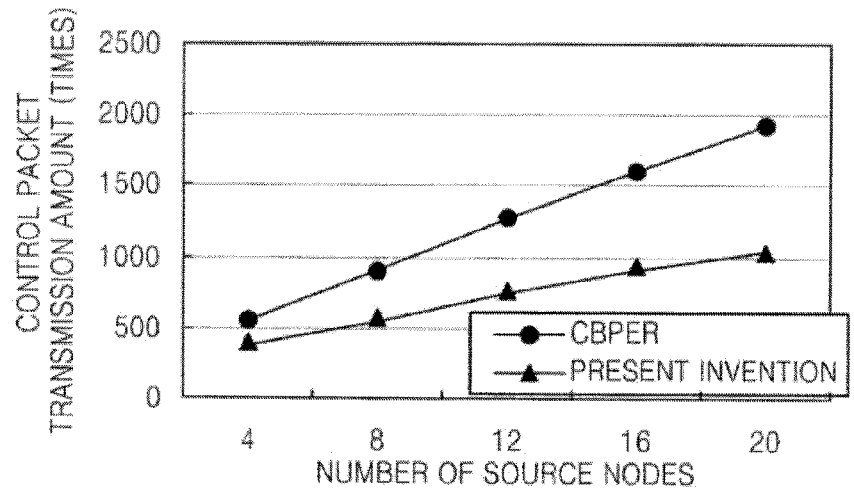
FIGS. 12 to 17 are graphs illustrating performance comparison results between the conventional CBPER method and a routing method according to an exemplary embodiment.

FIG. 12 shows variations of amount of the control packets transmitted in the wireless sensor network according to the increase of the number of source nodes when using the CBPER method and the routing method of the present invention.

As shown in FIG. 12, the number of the control packet transmissions of the CBPER method is greater than that of the routing method when the same number of the source nodes exists. Also, the gap of the packet transmission amounts between the CBPER and the routing method of the present invention is widened as the number of source nodes increases. This means that the routing method of the present invention is more efficient than the conventional CBPER method especially when the more source nodes exist.

FIG. 12 shows that the routing method of the present more efficient as much as 54% than the conventional CBPER method in control packet transmission amount when 20 source nodes exist in the wireless sensor network. This is because the routing method of the present invention reduces the number of data announcement packets to 50% and the number of data request packets to 53% relative to the conventional CBPER method.

Figure 13:
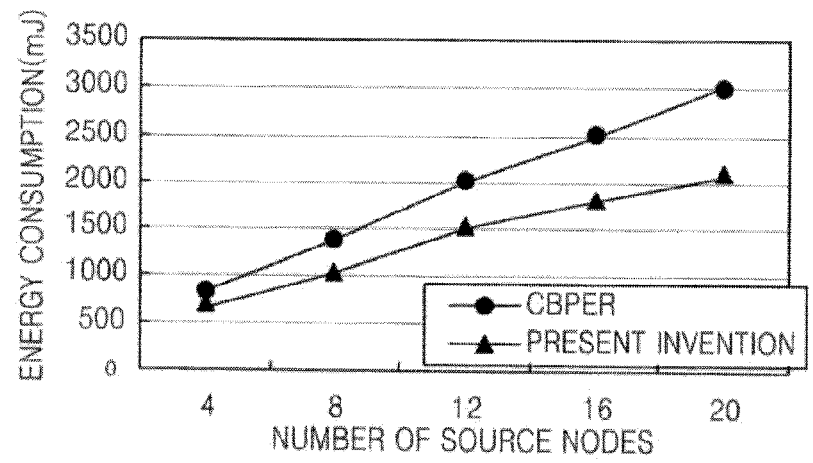
Figure 14:
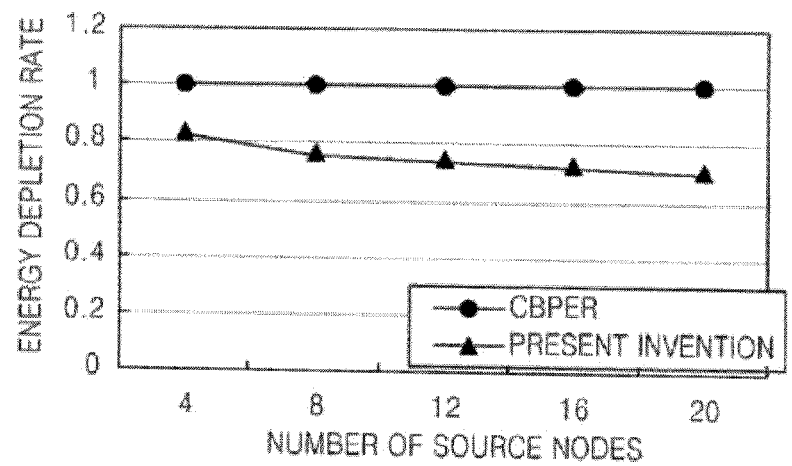

FIGS. 13 and 14 show variations of energy consumption of the wireless sensor network to numbers of the source nodes when using the conventional CBPER method and the routing method of the present invention.

As shown in FIGS. 13 and 14, the energy consumption of the routing method of the present invention is lower than that of the conventional CBPER method, and the energy depletion rate of the routing method of the present invention decreases as the number of the source nodes increases. The energy depletion rate of the present invention decreases to the level of 70% of the CBPER rate when the number of the source nodes reaches to 20 because the amount of the packet transmissions reduced to 54%.

Figure 15:
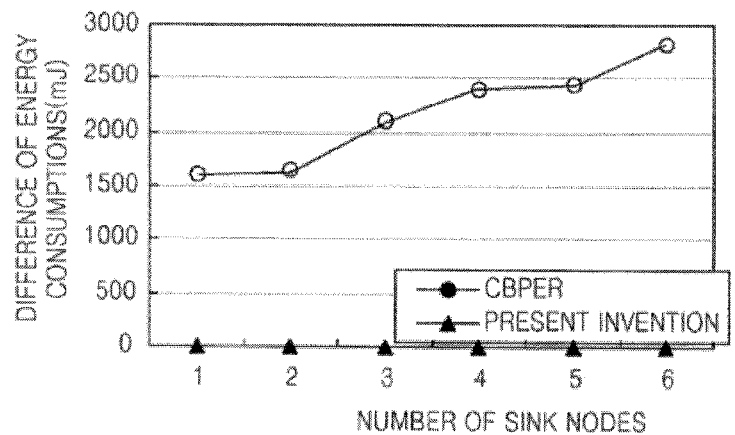

FIG. 15 shows variations of the energy consumptions of the wireless sensor network to the number of sink nodes when using the CBPER method and the routing method of the present invention.

As shown in FIG. 15, the energy consumption of the routing method of the present invention maintained at a low level regardless of the number of the sink nodes, whereas the energy consumption of the conventional CBPER method increases as the number of the sink nodes increases. Accordingly, the routing method of the present invention is advantageous in an environment in which multiple sink nodes exist.

Figure 16:
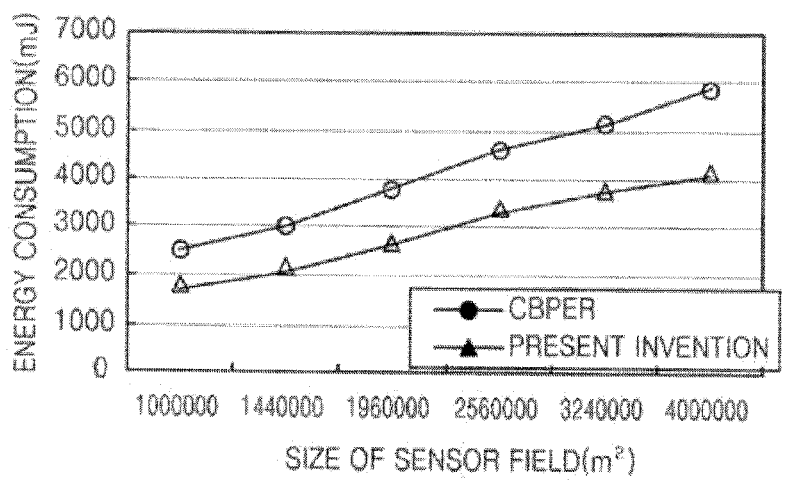
Figure 17:
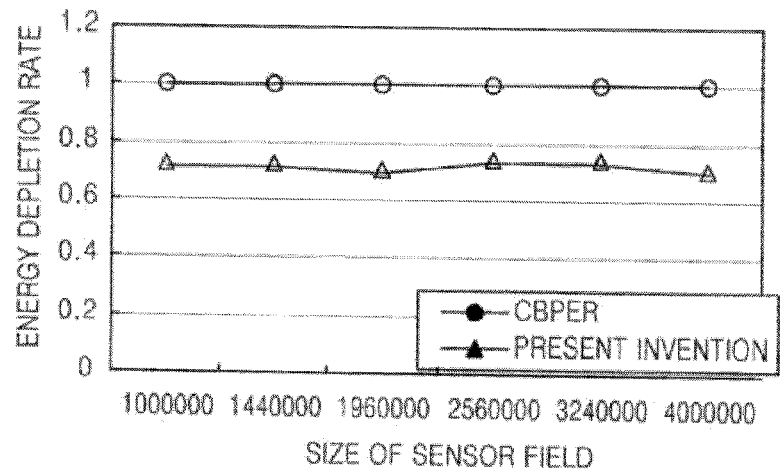

FIGS. 16 and 17 show variations of energy consumption of a wireless sensor network to sizes of sensor fields when using the conventional CBPER method and the routing method of the present invention. As shown in FIGS. 16 and 17, the energy consumption of the routing method of the present invention is lower than that of the conventional CBPER method, and the energy depletion rate of the routing method of the present invention is maintained at a level of 70% to that of conventional CBPER method regardless of the size of the sensor field.

As described above, the routing method of the present invention reduces the transmission amounts of the data announcement data request packets, thereby reducing the routing path configuration cost and energy depletion rate to 54% and 70% of those of the conventional routing method. Also, the routing method of the present invention maintains the network performance regardless of the number of sink nodes and the size of sensor field, thereby being advantageous for large scale wireless sensor network having multiple sink nodes.

Although exemplary embodiments of the present invention have been described in detail hereinabove, it should be clearly understood that many variations and/or modifications of the basic inventive concepts herein taught which may appear to those skilled in the present art will still fall within the spirit and scope of the present invention, as defined in the appended claims.

INDUSTRIAL APPLICABILITY

The routing method of the present invention can be applied to various ubiquitous computing fields.

The invention claimed is:

1. A routing method for a wireless sensor network having a sensor field defined by a plurality of clusters each including a plurality of sensor nodes and a header node, one of the cluster is a destination cluster including a sink node, comprising:
announcing, at at least one source node which is the sensor node detecting an event, the event by transmitting a data announcement packet;
requesting, at the sink node, the source node to transmit data required for ubiquitous services; and
transmitting, at the at least one source node, data to the sink node,
wherein announcing the event comprises:
relaying, at the at least one source node, a data announcement packet from a source cluster to which the source node belongs to a destination cluster which is arranged along an $i^{th}$ second direction axis through the header nodes of the clusters arranged along a first direction axis of the source cluster,
wherein the $i^{th}$ second direction axis is a center second direction axis in the sensor field, and the first direction axis is a vertical direction axis in the sensor field, wherein the sensor field comprises the clusters defined at cross sections of a plurality of first and second direction axes.

2. The routing method of claim 1, wherein a plurality of source nodes and source and destination clusters exist in the sensor field.

3. The routing method of claim 1, wherein announcing the event comprises:
detecting the event;
generating a data announcement packet as the source node; and
forwarding the data announcement packet to a header node of the destination cluster via header nodes arranged along a routing path to the destination cluster.

4. The routing method of claim 3, wherein forwarding the data announcement packet comprises:
transmitting the data announcement packet to a header node of the source cluster;
caching, at the header node of the source cluster, the data announcement packet;
determining, at the header node of the source cluster, whether to relaying the data announcement packet to the header node of the destination cluster via header nodes of the neighbor clusters arranged on the routing path; and
relaying, if it is determined to forward the data announcement packet, the data announcement packet to the header node of the destination cluster.

5. The routing method of claim 4, wherein relaying the data announcement packet to the header node of the destination cluster comprises:
determining, at the header node of each clusters arranged on the routing path to the destination cluster, whether to forward the data announcement packet to a predetermined cluster; and
forwarding the data announcement packet to the predetermined cluster on the basis of the determination result.

6. The routing method of claim 5, wherein the predetermined cluster is a next hop cluster arranged on the routing path.

7. The routing method of claim 1, wherein requesting the source node to transmit data comprises:
transmitting a first phase data request packet to header nodes of clusters arranged along the $i^{th}$ second direction axis; and
transmitting, at the header nodes of the clusters arranged along the second direction axis, a second phase data request packet to the source node of the corresponding source cluster.

8. The routing method of claim 7, wherein transmitting a first phase data request packet comprises forwarding the first phase data request packet to header nodes of clusters arranged along $j^{th}$ second direction axis together with the head cluster which includes at least one immediate agent node corresponding to the sink node, header nodes of the clusters arranged along $i^{th}$ second direction axis, and header nodes of the clusters arranged along an second direction axis on which the source cluster is positioned between the $j^{th}$ and $i^{th}$ horizontal axes.

9. The routing method of claim 8, wherein the immediate agent node is a sensor node located at a nearest position from the sink node.

10. The routing method of claim 8, wherein the first direction axis is a vertical axis and the second direction axis is a horizontal axis.

11. The routing method of claim 7, wherein transmitting a second phase data request packet comprises:
   determining, at the header node of each cluster arranged along the second direction axis, whether the cached data announcement packet is valid;
   determining, if the cached data announcement packet is valid, whether to forward the second phase data request packet to the source node; and
   forwarding, if it is determined to forward the second phase data request packet, the second phase data request packet to the source node.

12. The routing method of claim 11, wherein determining whether the cached data announcement packet is valid is performed on the basis of a data generation time contained in the data announcement packet.

13. The routing method of claim 12, wherein determining whether to forward the second phase data request packet to the source node is performed on the basis of relative locations of the source node and sink node.

14. The routing method of claim 13, wherein determining whether to forward the second phase data request packet to the source node comprises:
   dividing the sensor field into a first and second half areas; and
   determining, if the source and sink nodes are located in the same half area, to forward second phase data request packet to the source node.

15. The routing method of claim 14, wherein the sensor field is divided into the first and second by a second direction axis.

16. The routing method of claim 11, wherein forwarding the second phase data request packet comprises transmitting the second phase data request packet in an inverse direction of the routing path of the data announcement packet.

17. The routing method of claim 8, wherein transmitting a first phase data request packet comprises:
   detecting a movement of the sink node after transmitting the first phase data request packet; and
   forwarding, if a movement of the sink node is detected, the first phase data request packet from an old immediate agent node to a new immediate agent node.

18. The routing method of claim 1, wherein the method is used in community computing.

* * * * *

UNITED STATES PATENT AND TRADEMARK OFFICE
CERTIFICATE OF CORRECTION

Page 1 of 1

PATENT NO. : 8,432,831 B2
APPLICATION NO. : 12/739793
DATED : April 30, 2013
INVENTOR(S) : Sung Young Jung et al.

It is certified that error appears in the above-identified patent and that said Letters Patent is hereby corrected as shown below:

On the Title page, at item (75) INVENTORS, delete "Jain" replace with -- Jai --.

On the Title page, at item (57) ABSTRACT, line 15, delete "ith" replace with -- $i^{th}$ --.

In the Claims

Claim 7: Column 10, line 57, insert -- $i^{th}$ -- after the word "the": "…. along the $i^{th}$ second direction axis, a second phase data …".

Claim 11: Column 11, line 15, insert -- $i^{th}$ -- after the word "the": "…. along the $i^{th}$ second direction axis, whether the cached data …".

Signed and Sealed this
Twenty-ninth Day of July, 2014

Michelle K. Lee
*Deputy Director of the United States Patent and Trademark Office*